US008295361B2

(12) United States Patent
Tseng et al.

(10) Patent No.: US 8,295,361 B2
(45) Date of Patent: Oct. 23, 2012

(54) VIDEO COMPRESSION CIRCUIT AND METHOD THEREOF

(75) Inventors: Huan-Chun Tseng, Tao Yuan Shien (TW); Wei-Min Chao, Taoyuan County (TW); Kuan-Ting Lai, Tao Yuan Shien (TW); Pai-Chin Liu, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 342 days.

(21) Appl. No.: 12/608,012

(22) Filed: Oct. 29, 2009

(65) Prior Publication Data

US 2010/0232513 A1 Sep. 16, 2010

(30) Foreign Application Priority Data

Mar. 11, 2009 (TW) ............................... 98107944 A

(51) Int. Cl.
*G06F 12/06* (2006.01)

(52) U.S. Cl. ......... 375/240.24; 375/240.13; 375/240.16; 345/574

(58) Field of Classification Search ........................ None
See application file for complete search history.

(56) References Cited

U.S. PATENT DOCUMENTS

| | | | | |
|---|---|---|---|---|
| 5,946,037 | A | 8/1999 | Ahnn | |
| 6,212,231 | B1 * | 4/2001 | Takano | 375/240.24 |
| 2005/0152452 | A1 * | 7/2005 | Suzuki | 375/240.16 |
| 2006/0284902 | A1 * | 12/2006 | Ng | 345/691 |
| 2007/0237231 | A1 * | 10/2007 | Sriram et al. | 375/240.13 |

FOREIGN PATENT DOCUMENTS

| | | | |
|---|---|---|---|
| CN | 1164166 | A | 11/1997 |
| CN | 1189060 | A | 7/1998 |
| CN | 1953549 | A | 4/2007 |
| GB | 2311680 | A | 10/1997 |

* cited by examiner

*Primary Examiner* — Sath V. Perungavoor
*Assistant Examiner* — Mohammed Jebari
(74) *Attorney, Agent, or Firm* — Rabin & Berdo, P.C.

(57) ABSTRACT

A video compression circuit including a video pre-processor, a macroblock data storage unit and a video processor is provided. When fulfilled by an input video signal, the video pre-processor converts the input video signal to generate a macroblock data. The macroblock data storage unit alternatively and temporally stores the macroblock data generated from the video pre-processor. The video processor alternatively reads the macroblock data stored in the macroblock data storage unit, and compresses the readout macroblock data to an output video signal.

7 Claims, 3 Drawing Sheets

VIDEO COMPRESSION CIRCUIT AND METHOD THEREOF

This application claims the benefit of Taiwan application Serial No. 98107944, filed Mar. 11, 2009, the subject matter of which is incorporated herein by reference.

BACKGROUND OF THE INVENTION

1. Field of the Invention

The invention relates in general to a video compression circuit and a method thereof, and more particularly to a video compression circuit and a method thereof, capable of reducing circuit cost and shortening processing delay time.

2. Description of the Related Art

Along with the popularity of network, AV streaming technology is now widely used in consumer products. As consumers' expectation of video quality is getting higher and higher, even superior video compression technologies such as MPEG4 and H.264 are provided for processing (compressing/decompressing) high resolution images. During video compression, input video signals (that is, original video signals) and reconstructed video signals (that is, compressed video signals) are stored in memories, respectively.

Currently, External Synchronous dynamic random access Memory (ESM) is used in storing the input video signals and the reconstructed video signals. During the storage of the input video signals, two input video memories are needed: one for writing the input video signals and the other for reading the input video signals. Currently, the size of the input video memory is normally one frame data. Likewise, during the storage of the reconstructed video signals, two reconstruct video memories are needed: one for writing the reconstructed video signals and the other for reading the reconstructed video signals. Currently, the size of the reconstructed video memory is at least one frame data.

However, as the video resolution is getting higher, larger memories are used for storing the video data. Consequently, the cost for the memory in a video compression circuit is increased. Thus, the cost of the video compression chip also increases.

Besides, according to generally known technology, data cannot be compressed before the input video memory is fulfilled (that is, one frame is completely inputted). Therefore, the delay time is too long (that is, the delay time is about the time length of one frame) and the compression rate is too low.

Thus, how to effectively reduce memory capacity and shorten the delay time has become a key to the performance of the video compression circuit.

SUMMARY OF THE INVENTION

The invention is directed to a video compression circuit and a method thereof capable of largely shortening processing delay time of input video signals.

The invention is directed to a video compression circuit and a method thereof, which is capable processing video signals by small-size reconstruct video memory, so as to reduce the hardware cost.

According to a first aspect of the present invention, a video compression circuit including a video pre-processor, a macroblock data storage unit and a video processor is provided. When fulfilled by an input video signal, the video pre-processor converts the input video signal for generating a macroblock data. The macroblock data storage unit alternatively and temporally stores the macroblock data generated from the video pre-processor. The video processor alternatively reads the macroblock data stored in the macroblock data storage unit, and compresses the readout macroblock data to generate an output video signal.

According to a second aspect of the present invention, a video compression method is provided. The method includes the following steps. An input video is received and temporarily stored. The input video signal is converted to generate a macroblock data. The macroblock data is alternatively and temporally stored. The temporarily stored macroblock data is alternatively read and compressed to generate an output video signal.

The invention will become apparent from the following detailed description of the preferred but non-limiting embodiments. The following description is made with reference to the accompanying drawings.

DETAILED DESCRIPTION OF EXAMPLES OF THE INVENTION

Examples of the invention is capable of largely reducing the capacity required for the input video memory and the reconstruct video memory, hence effectively reducing hardware cost for the video compression circuit. Furthermore, data compression can start immediately after just a part of an input frame is received, hence largely shortening processing delay time for input video.

Figure 1:
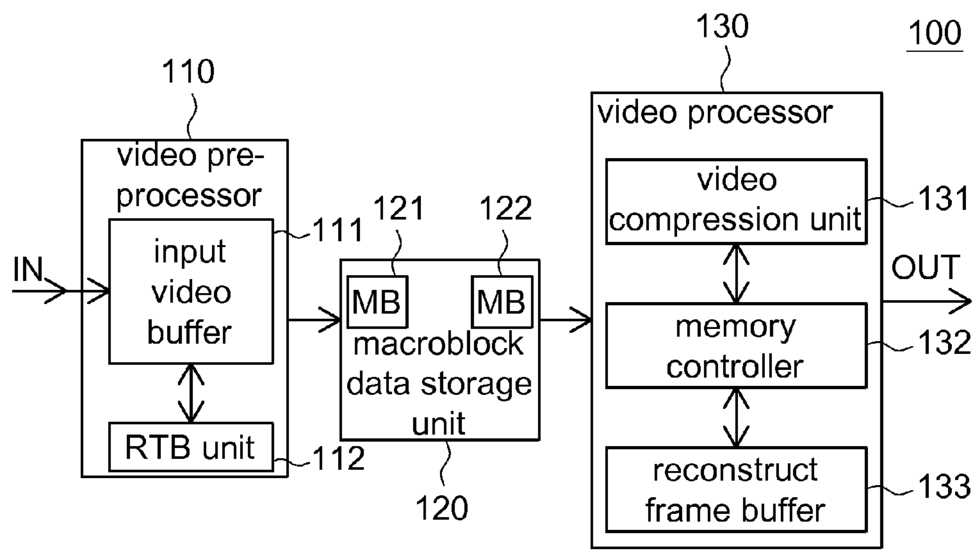
FIG. 1 shows a block diagram of a video compression circuit according to an embodiment of the invention.

Referring to FIG. 1, a block diagram of a video compression circuit 100 according to an embodiment of the invention is shown. As indicated in FIG. 1, the video compression circuit 100 at least includes a video pre-processor 110, a macroblock data storage unit 120 and a video processor 130. The video pre-processor 110 at least includes an input video buffer 111 and a raster to block (RTB) unit 112. The macroblock data storage unit 120 at least includes several macroblock buffers (MB) exemplified by macroblock buffers (MB) 121 and 122. The video processor 130 at least includes a video compression unit 131, a memory controller 132 and a reconstruct frame buffer 133.

The video pre-processor 110 is used for temporarily storing an input video signal IN, converting the input video signal IN (for example, converting its format) and outputting the converted input video to the macroblock data storage unit 120. In greater details, the input video signal IN is temporarily stored in the input video buffer 111 of the video pre-processor 110. The input video buffer 111 includes 16 line buffers for example. Taking a frame of the input video signal IN having 352*288 for example, that is, a frame having 288 lines, and each line having 352 pixel data. Each line buffer of the input video buffer 111 can store a line of the input video signal IN. The input video signal IN is inputted to the input video buffer 111 in raster scanning.

Figure 2:
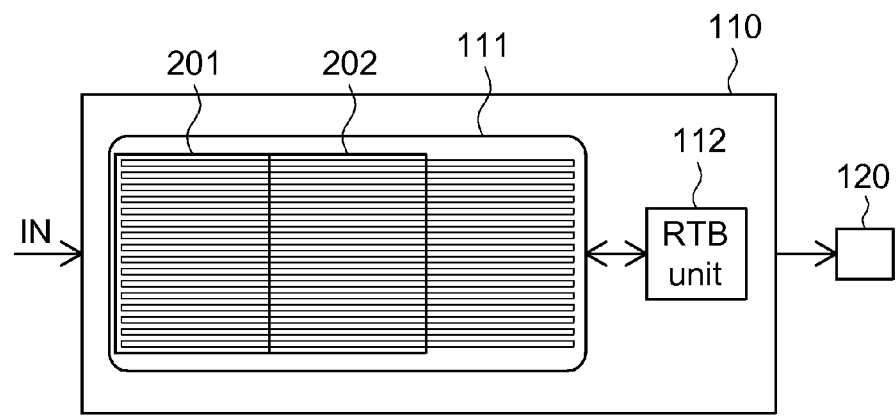
FIG. 2 shows how to convert data in raster to block.

After the input video buffer 111 is fulfilled, the RTB unit 112 performs raster to block conversion on data stored in the input video buffer 111. Referring to FIG. 2, a raster to block conversion on data stored in the input video buffer 111 is shown. As indicated in FIG. 2, after the input video buffer 111 is fulfilled for the first time by a part of the input video signal IN, the first 16 pixel data of each line buffer is fetched, by the RTB unit 112, as a macroblock data 201. Next, the 17-th to the 32-th pixel data of each line buffer will be fetched by the RTB unit 112 as a macroblock data 202. By the same token, the RTB unit 112 fetches data from the input video buffer 111 and arranges into a macroblock data. The fetched macroblock data is inputted to the macroblock data storage unit 120.

After a macroblock data is fetched from the input video buffer 111, the video pre-processor 110 begin to receive remaining parts of the input video signal IN, wherein data which is already fetched out is overwritten by the new-written parts of the input video signal IN. By the same token, the video processing delay time is reduced from a time length for the whole frame in prior art to a shorter time length for just 16 lines of the whole frame as in the embodiment of the invention. Assume the frame of the input video signal IN is of 352*288. While the video processing delay time is the time length for receiving a complete frame (that is, 288 lines) as in prior art, the video processing delay time is the time length for receiving 16 lines of the complete frame (having 288 line) as in the present embodiment of the invention. Thus, the video processing delay time as in the present embodiment of the invention is reduced to be 1/18 (that is, 16/288) of that as in the prior art.

The macroblock data storage unit 120 is used for temporarily storing the macroblock data fetched from the RTB unit 112, and outputting the macroblock data to the video processor 130. That is, the macroblock data fetched from the RTB unit 112 is alternatively written to the two macroblock buffers 121 and 122 of the macroblock data storage unit 120. For example, the first fetched macroblock data is stored in the macroblock buffer 121, the second fetched macroblock data is stored in the macroblock buffer 122, and the third fetched macroblock data is stored in the macroblock buffer 121 and so on.

The macroblock buffers 121 and 122 are alternatively written and read by the RTB unit 112 and the video processor 130. When the RTB unit 112 writes a macroblock data to one of the macroblock buffers 121 and 122, the video processor 130 reads a macroblock data from the other one of the macroblock buffers 121 and 122 to perform video compression. Thus, the macroblock data storage unit 120 is alternatively read and written, hence avoiding the crash between data writing and data reading.

The video processor 130 is used for compressing the macroblock data fetched from the macroblock data storage unit 120 to generate an output video signal OUT. During video compression, the video processor refers to a previous reconstructed video to achieve high compression ratio (that is, to make the size of the output video signal OUT as small as possible). In the present embodiment of the invention, to avoid the crash between data reading and data writing and to reduce the space of memory, data life cycle estimation in memory management technology is used for estimating a minimum memory space for the reconstruct frame buffer 133. According to the video compression algorithm, unit of data is macroblock, so the minimum memory space required can be obtained once the life cycle of each macroblock is known. In calculating the life cycle of each macroblock, the size of the motion estimation search range (MESR) affects the life cycle of a macroblock.

Figure 3:
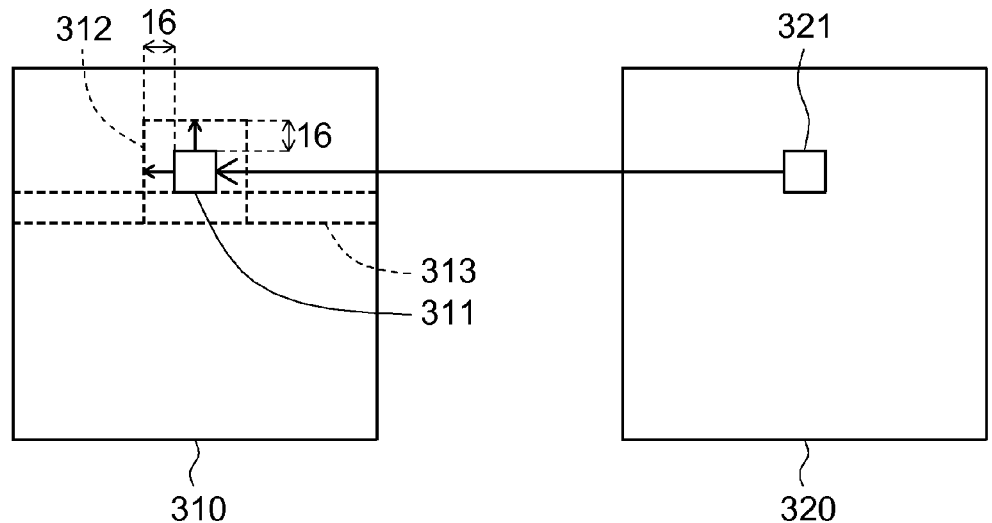
FIG. 3 shows estimation of life cycle of each macroblock.

FIG. 3 shows how to estimate the life cycle of each macroblock. In FIG. 3, the designation 310 denotes a previous frame, the designation 320 denotes a current frame, the designations 311 and 321 denote macroblock data, and the designation 312 denotes a reference block. The position of the macroblock data 311 in the previous frame 310 is the same with the position of the macroblock data 321 in the current frame 320. In the present embodiment of the invention, let the motion estimation search range be 16 and let the size of the macroblock be 16*16. However, the invention is not limited to the above exemplification. The reference block 312 is set based on the macroblock data (311 or 321) and the motion estimation search range. Let FIG. 3 be taken for example. The range of the reference block 312 is larger than the macroblock data 311 by 16 dots on the top direction, on the bottom direction, on the right direction and on the left direction respectively, wherein one dot denotes one pixel data. Thus, in FIG. 3, the size of the reference block 312 is 48*48.

During reconstruction of the current macroblock data 321 of the current frame 320, the reference block 312 of the previous frame 310 is referenced; and a most similar macroblock data (most similar to the current macroblock data 321) in the reference block 312 is found, so as to reconstruct the macroblock data 321 accordingly. How to find the most similar macroblock is not specified here. When the most similar macroblock is found, another parameter, for example, a motion vector parameter, is obtained, which denotes a position of the most similar macroblock relative to the macroblock data 311 or 321.

Referring to FIG. 3 again. After all the macroblock data on the same row as the current macroblock data 321 of the current frame 320 refer to a row macroblock data 313 next to the macroblock data 311 of the previous frame 310, the row macroblock data 313 of the previous frame 310 can be overwritten. Thus, the life cycle of each macroblock data is a time length for one frame plus a time length for one row macroblock data. If a macroblock data is written to a position of the memory, the macroblock cannot be overwritten until the time length for one frame plus the time length for one row macroblock data is passed. Thus, the minimum storage space required for reconstructing a frame is (1) the space required for storing the whole frame plus (2) the space required for storing one row macroblock data. The above is expressed as:

$$MS=FS+\mathrm{MESR}*RN/X,$$

wherein, MS denotes the size of the reconstruct frame buffer 133, FS denotes the memory space required for storing a whole frame, MESR denotes the motion estimation search range, RN denotes the size of one row macroblock data, and X denotes the height of a macroblock data.

The performance of the present embodiment of the invention is further disclosed in Table 1. Table 1 shows a comparison of the reconstruct frame buffer required under different motion estimation search ranges (MESRs) between the present embodiment of the invention and the prior art. As indicated in Table 1, the required capacity of the reconstruct frame buffer is much smaller in the present embodiment of the invention.

TABLE 1

| MESR | PRIOR ART (Byte) | The Present Embodiment Of The Invention (Byte) | Reduced Ratio |
|---|---|---|---|
| 16 | 2764800 | 1413120 | 49% |
| 32 | 2764800 | 1443840 | 48% |
| 64 | 2764800 | 1474560 | 47% |

Figure 4:
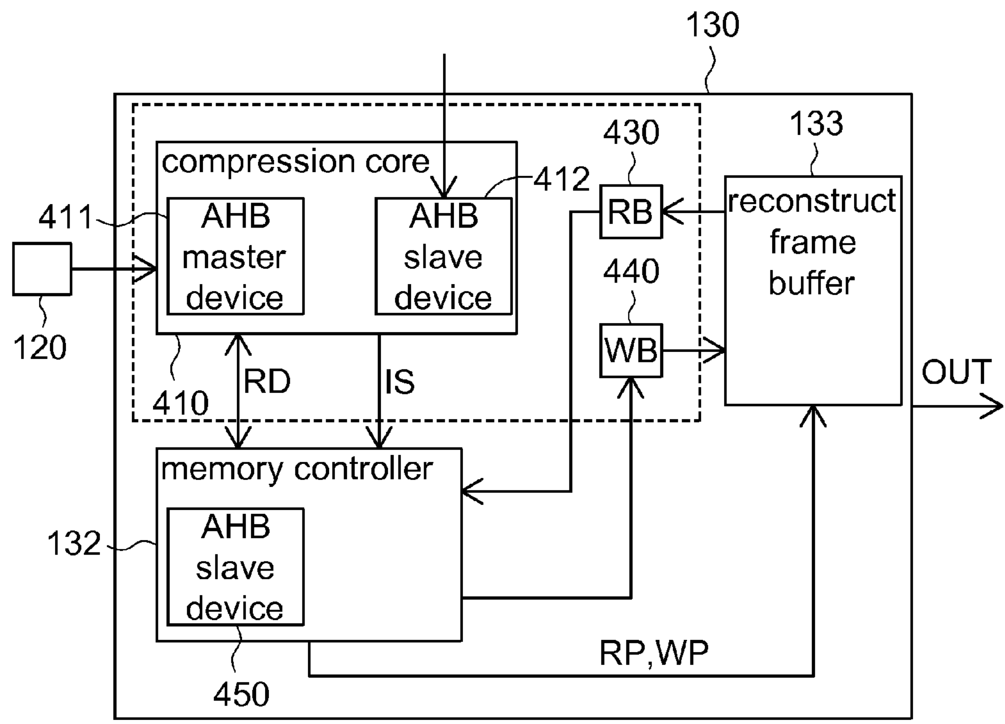
FIG. 4 shows a block diagram of a video processor according to the embodiment of the invention.

Referring to FIG. 4, a block diagram of the video processor 130 according to the embodiment of the invention is shown. As indicated in FIG. 4, the video compression unit 131 of the video processor 130 at least includes a compression core 410, an advanced high performance bridge (AHB) master device 411, an AHB slave device 412, a read buffer (RB) 430 and a write buffer (WB) 440. The memory controller 132 further includes an AHB slave device 450.

The compression core 410 is used for video compression. The previous reconstructed frame is referenced by the compression core 410 when the compression core 410 performs video compression to generate a reconstructed frame. The operation as indicated in FIG. 3 is performed by the compression core 410. The AHB master device 411 is interfaced to the memory controller 132. The reconstruct frame data RD from the compression core 410 to the reconstruct frame buffer 133 is transmitted to the memory controller 132 through the AHB master device 411. Likewise, the reconstruct frame data RD (used as reference data during reconstruction) read from the reconstruct frame buffer 133 is transmitted to the compression core 410 through the AHB master device 411. The external parameter received by the compression core 410 through the AHB slave device 412 is used for setting the compression core 410.

The reconstruct frame buffer 133, having larger capacity but slower operating frequency, is not as fast as the compression core 410. In order to avoid that the compression core 410 waits when data is read from or written to the reconstruct frame buffer 133 and that the performance of the compression core 410 is negatively affected, the reconstruct frame buffer 133 is pre-fetched in the present embodiment of the invention. Data pre-read by the reconstruct frame buffer 133 is stored in the read buffer 430 first, and transmitted to the compression core 410. Likewise, data to be written to the reconstruct frame buffer 133 by the compression core 410 is stored in the write buffer 440 first and then transmitted to the reconstruct frame buffer 133.

To pre-fetch the reconstruct frame buffer 133, the memory controller 132 receives an information signal IS transmitted from the compression core 410, wherein the information signal IS denotes a relevant information for a macroblock currently processed (read/written) by the compression core 410. In the present embodiment of the invention, examples of the information signal IS include motion vector, macroblock number.

During data reading, after the memory controller 132 receives the information signal IS, the memory controller 132 calculates a read position (that is a read pointer RP) for a next data (that is, the previous reconstruct frame required by the compression core 410) in the reconstruct frame buffer 133, pre-reads the next data and loads in the read buffer 430, and then sends as the reconstruct frame data RD to the compression core 410.

Likewise, during data writing, after the memory controller 132 receives the information signal IS, the memory controller 132 calculates a write position (that is, the write pointer WP) for the current data (that is, the current reconstructed frame compressed by the compression core 410) in the reconstruct frame buffer 133, pre-writes the current data (that is, the reconstruct frame data RD transmitted from the compression core 410) to the write buffer 440 first, and then transmits to the reconstruct frame buffer 133. If the reconstruct frame buffer 133 is a single-port buffer, then the operations of reading and writing must be alternated. If the reconstruct frame buffer 133 is a dual-port buffer, then the operations of reading and writing can be performed at the same time.

The AHB slave device 450 of the memory controller 132 can receive data from and transmit data to the compression core 410. Any compression core conformed to AHB bus definition is suitable for the compression core 410 of the present embodiment of the invention.

Figure 5:
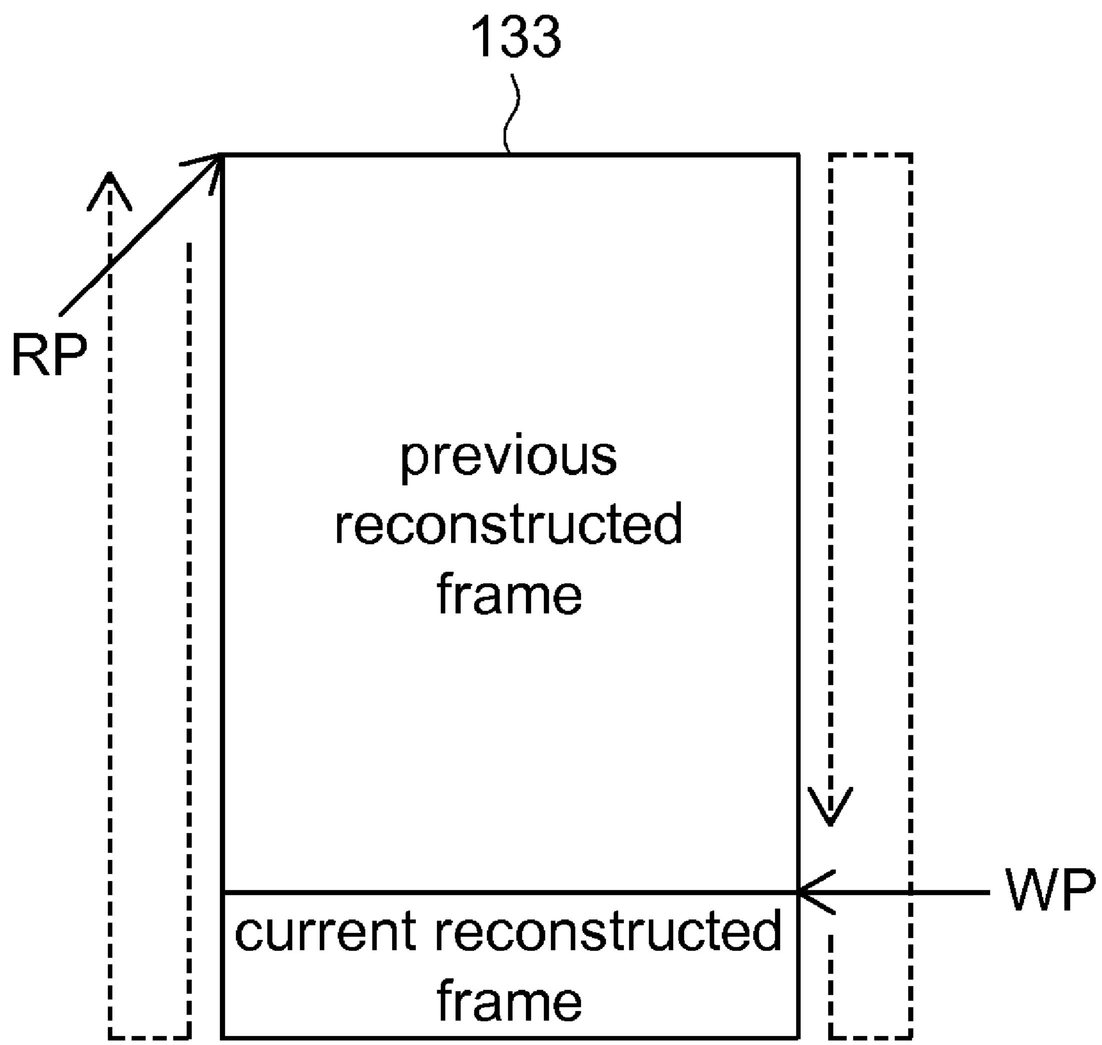
FIG. 5 shows cyclic write and read to/from a reconstruct frame buffer in the embodiment of the invention.

FIG. 5 shows cyclical write and read to/from the reconstruct frame buffer 133 in the embodiment of the invention. During cyclical reading/writing from/to the reconstruct frame buffer 133, the memory controller 132 converts read/write address transmitted from the compression core 410 to generate a read pointer RP and a write pointer WP. That is, in the present embodiment of the invention, the reconstruct frame buffer 133 is read/written as a ring buffer. During data reading, a previous reconstructed frame is read from the reconstruct frame buffer 133 according to the read pointer RP and transmitted to the compression core for reference. During data writing, the current reconstructed frame is fetched from the write buffer 440 according to the write pointer WP and loaded to the reconstruct frame buffer 133.

To summarize, the video compression circuit disclosed in the above embodiments of the invention has many advantages exemplified below:

1. The memory required for temporarily storing the input video is reduced.

2. The delay time is shortened from the time length for one frame to the time length for 16 lines.

3. The capacity required of the reconstruct frame buffer is reduced. Through excellent memory management, the capacity of the reconstruct frame buffer required in the present embodiment of the invention is about a half of the capacity required in the prior art.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video compression circuit, comprising:

a video pre-processor, temporarily storing an input video signal, and converting the input video signal to generate macroblock data when the video pre-processor is filled;

a macroblock data storage unit coupled to the video pre-processor, temporarily storing the macroblock data; and a video processor coupled to the macroblock data storage unit, compressing the macroblock data accessed from the macroblock data storage unit to generate an output video signal;

wherein the video pre-processor comprises:

an input video buffer, temporarily storing the input video signal, wherein when a unit of the input video signal is a frame, the capacity of the input video buffer is smaller than a frame, and the input video signal is stored in the input video buffer in raster;

wherein:

during compression, a previous reconstructed video of the input video signal is referenced by the video processor to reconstruct a current reconstructed video of the input video signal;

during reconstruction of a first macroblock data of the current reconstructed video of the input video signal, a reference block of the previous reconstructed video of the input video signal is referenced by the video processor, and the reference block is set based on a position information and a motion estimation search range parameter of the first macroblock data;

during reconstruction, the reference block of the previous reconstructed video of the input video signal is referenced by the video processor to find a most similar macroblock in the reference block so as to reconstruct the first macroblock data of the current reconstructed video of the input video signal;

in finding the most similar macroblock in the reference block, the video processor obtains a dynamic vector parameter denoting a relative position of the most similar macroblock;

the video processor at least comprises:

a video compression unit, receiving and compressing the macroblock data accessed from the macroblock data storage unit;

a memory controller coupled to the video compression unit; and a reconstruct frame buffer coupled to the memory controller and the video compression unit, wherein, under control of the memory controller, the video compression unit reads the previous reconstructed video of the input video signal from the reconstruct frame buffer and writes the compressed current reconstructed video of the input video signal to the reconstruct frame buffer;

the video compression unit at least comprises:

a compression core, receiving and compressing the macroblock data accessed from the macroblock data storage unit;

an advanced high-performance bridge (AHB) master device, interfaced to the memory controller, wherein, a reconstruct frame data from the compression core to the reconstruct frame buffer is transmitted to the memory controller through the AHB master device, and the reconstruct frame data read from the reconstruct frame buffer is transmitted to the compression core through the AHB master device;

an AHB slave device, wherein the compression core receives a setting parameter inputted from an external source through the AHB slave device to set the compression core;

a read buffer, wherein the reconstruct frame data pre-read from the reconstruct frame buffer is stored in the read buffer first and then transmitted to the compression core; and a write buffer, wherein the reconstruct frame data from the compression core to the reconstruct frame buffer is stored in the write buffer first and then transmitted to the reconstruct frame buffer;

to pre-fetch the reconstruct frame buffer, the memory controller receives an information signal from the compression core which denotes a relevant information of the first macroblock data currently processed by the compression core; and the information signal comprises a dynamic vector parameter and a number of the first macroblock data;

during data reading, after the memory controller receives the information signal, the memory controller calculates a read position for the previous reconstructed video of the input video signal, required by the compression core, in the reconstruct frame buffer, pre-reads the previous reconstructed video of the input video signal and loads the pre-read previous reconstructed video of the input video signal to the read buffer, and transmits the previous reconstructed video of the input video signal as the reconstruct frame data to the compression core; and during data writing, after the memory controller receives the information signal, the memory controller calculates a write position for the current reconstructed video of the input video signal, compressed by the compression core, in the reconstruct frame buffer and pre-writes the current reconstructed video of the input video signal to the write buffer, and transmits the current reconstructed video of the input video signal to the reconstruct frame buffer;

wherein a life cycle of each macroblock data of the previous reconstructed video stored in the reconstruct frame buffer is a time length for one frame plus a time length for one row macroblock data.

2. The video compression circuit according to claim 1, wherein the video pre-processor further comprises:

an arrangement transformation unit coupled to the input video buffer, wherein when the input video buffer is filled by the input video signal, the arrangement transformation unit reads the input video signal from the input video buffer and performs a raster-to-block conversion on the input video signal to generate the macroblock data.

3. The video compression circuit according to claim 2, wherein the macroblock data storage unit comprises:

a first macroblock data buffer and a second macroblock data buffer, alternatively storing the macroblock data transmitted from the video pre-processor, wherein the first macroblock data buffer and the second macroblock data buffer are alternatively written and read by the arrangement transformation unit and the video processor.

4. A video compression method, comprising:

receiving and temporarily storing an input video signal;

converting the input video signal to generate a macroblock data;

alternatively and temporally storing the macroblock; and alternatively reading the temporarily stored macroblock and compressing the temporarily stored macroblock to generate an output video signal;

wherein, a unit of the input video signal is a frame, and the step of converting the input video signal to generate the macroblock data comprises:

temporarily storing the input video signal in raster; and reading the input video signal from an input video buffer and performing a raster-to-block conversion on the input video signal to generate the macroblock data when the input video signal fills an input video buffer, wherein the capacity of the input video buffer is smaller than a frame wherein:

the step of generating the output video signal comprises:

during compression, referring to a previous reconstructed video of the input video signal to reconstruct a current reconstructed video of the input video signal;

during reconstruction of a first macroblock data of the current reconstructed video of the input video signal, referring to a reference block of the previous reconstructed video of the input video signal, and finding a most similar macroblock in the reference block to reconstruct the first macroblock data of the current reconstructed video of the input video signal, wherein the reference block is set based on a position information and a motion estimation search range parameter of the first macroblock data;

wherein, in finding the most similar macroblock in the reference block, a dynamic vector parameter denoting a relative position of the most similar macroblock is further obtained;

reading the previous reconstructed video of the input video signal from a reconstruct frame buffer;

writing the compressed current reconstructed video of the input video signal to the reconstruct frame buffer;

receiving an information signal, denoting a relevant information of the first macroblock data currently processed, so as to pre-fetch the reconstruct frame buffer, wherein, the information signal comprises the dynamic vector parameter, and a number information of the first macroblock data;

during data reading, calculating a read position for the previous reconstructed video of the input video signal in the reconstruct frame buffer after the information signal is received; and pre-reading the previous reconstructed video of the input video signal;

wherein a life cycle of each macroblock data of the previous reconstructed video stored in the reconstruct frame buffer is a time length for one frame plus a time length for one row macroblock data.

5. The video compression method according to claim 4, wherein, the step of generating the output video signal further comprises:

during data writing, after the information signal is received, calculating a write position for the compressed current reconstructed video of the input video signal in the reconstruct frame buffer;

pre-writing the compressed current reconstructed video of the input video signal to a write buffer; and then transmitting the compressed current reconstructed video of the input video signal to the reconstruct frame buffer.

6. The video compression circuit according to claim 1, wherein a minimum storage space required for the reconstruct frame buffer is based on the following equation:

$$MS=FS+\mathrm{MESR}*RN/X,$$

wherein, MS denotes the size of the reconstruct frame buffer, FS denotes a memory space required for storing a whole frame, MESR denotes a motion estimation search range, RN denotes the size of one row of macroblock data, and X denotes the height of the macroblock data.

7. The video compression method according to claim 4, wherein a minimum storage space required for the reconstruct frame buffer is based on the following equation:

$$MS=FS+\mathrm{MESR}*RN/X,$$

wherein, MS denotes the size of the reconstruct frame buffer, FS denotes a memory space required for storing a whole frame, MESR denotes a motion estimation search range, RN denotes the size of one row of macroblock data, and X denotes the height of the macroblock data.

* * * * *